United States Patent
McGee et al.

(10) Patent No.: US 7,328,191 B2
(45) Date of Patent: Feb. 5, 2008

(54) METHODS AND SYSTEMS FOR PROCESSING UNRESTRICTED STORED-VALUE INSTRUMENTS

(75) Inventors: Christopher R. McGee, Aurora, CO (US); David Baumgartner, Parker, CO (US)

(73) Assignee: First Data Corporation, Englewood, CO (US)

( * ) Notice: Subject to any disclaimer, the term of this patent is extended or adjusted under 35 U.S.C. 154(b) by 869 days.

(21) Appl. No.: 10/405,043

(22) Filed: Mar. 31, 2003

(65) Prior Publication Data

US 2004/0193551 A1   Sep. 30, 2004

(51) Int. Cl.
*G06Q 99/00*   (2006.01)

(52) U.S. Cl. .......................... 705/67; 705/64; 705/65; 705/79; 705/14; 705/41; 235/375; 235/380; 235/379; 235/382

(58) Field of Classification Search ............ 705/64–79, 705/14, 41; 235/375, 380, 379, 382
See application file for complete search history.

(56) References Cited

U.S. PATENT DOCUMENTS

| | | |
|---|---|---|
| 4,528,643 A | 7/1985 | Freeny, Jr. |
| 4,700,005 A | 10/1987 | Green |
| 4,884,212 A | 11/1989 | Stutsman |
| 5,146,067 A | 9/1992 | Sloan et al. |
| 5,220,501 A | 6/1993 | Lawlor et al. |
| 5,255,182 A | 10/1993 | Adams |
| 5,352,876 A | 10/1994 | Watanabe et al. |
| 5,440,108 A | 8/1995 | Tran et al. |
| 5,471,669 A | 11/1995 | Lidman |
| 5,477,038 A | 12/1995 | Levine et al. |
| 5,504,808 A | 4/1996 | Hamrick, Jr. |
| 5,511,114 A | 4/1996 | Stimson et al. |
| 5,513,117 A | 4/1996 | Small |
| 5,557,516 A | 9/1996 | Hogan |
| 5,592,400 A | 1/1997 | Sasou et al. |
| 5,637,845 A | 6/1997 | Kolls |
| 5,678,010 A | 10/1997 | Pittenger et al. |
| 5,721,768 A | 2/1998 | Stimson et al. |
| 5,796,832 A | 8/1998 | Kawan |
| 5,868,236 A | 2/1999 | Rademacher |
| 5,903,633 A | 5/1999 | Lorsch |
| 5,936,221 A | 8/1999 | Corder et al. |
| 5,983,003 A | 11/1999 | Lection et al. |
| 5,984,181 A | 11/1999 | Kreft |

(Continued)

OTHER PUBLICATIONS

Web Page, "Charitygift: Generosity in a to-go box", at www.charitygift.com/index.jsp, Printed Mar. 6, 2003.

(Continued)

*Primary Examiner*—Jalatee Worjloh
(74) *Attorney, Agent, or Firm*—Townsend and Townsend and Crew LLP (57) ABSTRACT

Methods and systems are provided for processing a stored-value instrument. An unrestricted value associated with the stored-value instrument is authenticated at an instrument-authority system in response to an authentication request received from a merchant point-of-sale terminal. An allocation request is received at the instrument-authority system for a restricted allocation of at least a portion of the authenticated value associated with the stored-value instrument. The authenticated value is allocated in accordance with the allocation request.

10 Claims, 5 Drawing Sheets

U.S. PATENT DOCUMENTS

| | | | |
|---|---|---|---|
| 5,987,438 | A | 11/1999 | Nakano et al. |
| 5,991,413 | A | 11/1999 | Arditti et al. |
| 5,991,748 | A | 11/1999 | Taskett |
| 6,006,988 | A | 12/1999 | Behrmann et al. |
| 6,129,275 | A | 10/2000 | Urquhart et al. |
| 6,169,975 | B1 | 1/2001 | White et al. |
| 6,193,155 | B1 | 2/2001 | Walker et al. |
| 6,295,522 | B1 * | 9/2001 | Boesch ............ 705/41 |
| 6,298,336 | B1 | 10/2001 | Davis et al. |
| 6,370,514 | B1 | 4/2002 | Messner |
| 6,386,457 | B1 | 5/2002 | Sorie |
| 6,405,182 | B1 | 6/2002 | Cuervo |
| 6,473,500 | B1 | 10/2002 | Risafi et al. |
| 6,510,983 | B2 | 1/2003 | Horowitz et al. |
| 6,970,851 | B1 * | 11/2005 | Goodwin et al. ............ 705/66 |
| 7,171,370 | B2 * | 1/2007 | Burke ............ 705/1 |
| 7,174,315 | B2 * | 2/2007 | Phillips et al. ............ 705/41 |
| 2001/0018660 | A1 | 8/2001 | Sehr |
| 2001/0023409 | A1 | 9/2001 | Keil |
| 2001/0023415 | A1 | 9/2001 | Keil |
| 2001/0047342 | A1 | 11/2001 | Cuervo |
| 2002/0103763 | A1 * | 8/2002 | Schutz ............ 705/64 |
| 2002/0152158 | A1 * | 10/2002 | Paleiov et al. ............ 705/39 |
| 2002/0174016 | A1 | 11/2002 | Cuervo |
| 2003/0053609 | A1 | 3/2003 | Risafi et al. |
| 2005/0127168 | A1 * | 6/2005 | Phillips et al. ............ 235/380 |
| 2006/0213985 | A1 * | 9/2006 | Walker et al. ............ 235/381 |

OTHER PUBLICATIONS

Web Page, "Charitygift: What to Expect", at www.charitygift.com/SelectCard?page.success=/cardshop/WhatToExpect.jsp&canFlash=yes, Printed Mar. 6, 2003.

Web page, "Charitygift: Gift Redemption", at www.charitygift.com/redemption/EnterNumber.jsp, Printed Mar. 6, 2003.

Web Page, "Charitygift: Charitygift Registry", at www.charitygift.com/cg?pg=honr, Printed Mar. 6, 2003.

Web Page, "Charitygift: How it Works", at www.charitygift.com/docs/about_us/how_it_works.jsp, Printed Mar. 6, 2003.

Web Page, "Charitygift: How it Works: About Charitygift", at www.charitygift.com/docs/about_us/about_us.jsp, Printed Mar. 6, 2003.

Web Page, "Charitygift: Products and Services", at www.charitygift.com/docs/about_us/products.jsp, Printed Mar. 6, 2003.

Web Page, "Charitygift: Letter from Founder", at www.charitygift.com/docs/about_us/letter.jsp, Printed Mar. 6, 2003.

Web Page, "Charitygift: Questions and Answers", at www.charitygift.com/docs/help/faq.jsp, Printed Mar. 6, 2003.

* cited by examiner

METHODS AND SYSTEMS FOR PROCESSING UNRESTRICTED STORED-VALUE INSTRUMENTS

BACKGROUND OF THE INVENTION

This application relates generally to stored-value instruments. More specifically, this application relates to methods and systems for processing stored-value instruments.

In recent years, stored-value cards have become increasingly popular among consumers. The steadily increasing demand for such cards, in the form of prepaid gift cards and other types of stored-value cards, has resulted in an increased number of merchants offering stored-value cards for sale. This success in marketing stored-value cards has, however, exposed an unexpected weakness with the way in which such cards are currently provided. In particular, each stored-value card is typically tied to use at a particular merchant and only for retail transactions. Thus, the convenience of the stored-value-card arrangement may be substantially mitigated by the need to keep many different cards associated with a variety of different merchants, particularly by those who use the cards most heavily. In addition, the limitation to retail transactions effectively excludes a variety of other types of transactions that consumers may wish to engage in.

There is, accordingly, a general need in the art for stored-value cards whose use is not restricted in these ways.

BRIEF SUMMARY OF THE INVENTION

Embodiments of the invention thus provide methods and systems for processing stored value instruments that permit their sale at merchants without such restrictions. The embodiments use an instrument-authority system that, in addition to managing the authentication and use of the stored-value instruments, provides an interface with recipients of the instruments to specify restrictions on their use after authentication.

In a first set of embodiments, a method is provided for processing a stored-value instrument. An unrestricted value associated with the stored-value instrument is authenticated at an instrument-authority system in response to an authentication request received from a merchant point-of-sale terminal. An allocation request is received at the instrument-authority system for a restricted allocation of at least a portion of the authenticated value associated with the stored-value instrument. The authenticated value is allocated in accordance with the allocation request.

In some such embodiments, allocating the authenticated value comprises assigning at least a portion of the authenticated value for a donation, which may qualify for a tax deduction. In such instances, a receipt for an amount of the donation may be transmitted to a holder of the stored-value instrument. In other embodiments, allocating the authenticated value comprises assigning at least a portion of the authenticated value for purchases at a specified merchant. Such purchases may be effected by receiving transaction information at the instrument-authority system from a point-of-sale terminal at a location of the specified merchant identifying the stored-value instrument and a debit amount. The authenticated value of the stored-value instrument assigned for purchases at the specified merchant may then be reduced by the debit amount. In some instances, the instrument-authority system may receive transaction information from a point-of-sale terminal that identifies the stored-value instrument and a debit amount that is greater than the authenticated value of the stored-value instrument assigned for purchases at the specified merchant. In such instances, an offer may be transmitted to the point-of-sale terminal to reallocate portions of the authenticated value for purchases at the specified merchant. In response, the instrument-authority system may receive an acceptance of the offer from the point-of-sale terminal, and reallocate the authenticated value in accordance with the offer. In effecting the transaction, the authenticated value assigned for purchases at the specified merchant may then be reduced in accordance with the reallocated authentication value.

In another set of embodiments, a method is also provided for processing a stored-value instrument. A value associated with the stored-value instrument is authenticated at an instrument-authority system in response to an authentication request received from a merchant point-of-sale terminal. The value is designated for charitable contribution but is otherwise unrestricted. An allocation request is received at the instrument-authority system for a restricted allocation of at least a portion of the authenticated value associated with the stored-value instrument to a specified charity. The authenticated value is allocated in accordance with the allocation request.

In some such embodiments, instructions are transmitted from the instrument-authority system for generation of a receipt at the merchant point-of-sale terminal. The allocated authenticated value may be donated in accordance with the allocation request. After passage of a predetermined time following authenticating the value, an unallocated portion of the authenticated value may be donated to a charity.

These methods may be implemented by a system having a communications system, a storage device, a processor in communication with the communications system and the storage device, and a memory coupled with the processor. The memory comprises a computer-readable storage medium having a computer-readable program embodied therein for directing operation of the instrument-authority system to process stored-value instruments in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention permit a consumer to purchase a stored-value presentation instrument that is not restricted to use for retail transactions at a particular merchant. In many embodiments, the presentation instrument may comprise a card, such as a plastic card, but the invention is not intended to be limited to such a form for the instrument. In some instances, the value of such an instrument is "fully unrestricted" in the sense that there are no a priori limitations imposed on the use of the value, either by type of transaction or by party to a transaction that uses the value. In other instances, the instrument's value may be only "partially unrestricted" by having one of these components restricted and having another of these components unrestricted. For example, the value might be restricted according to the type of transaction in which it may be used but be unrestricted in terms of who the party to the transaction is to be. In one embodiment, such partially unrestricted value corresponds to value associated with an instrument to be used only for charitable donations, but without any a priori restriction on the charity recipient. In the description of embodiments herein, reference to value that is "unrestricted" is thus intended to refer to value that is not restricted either by type or by party to a transaction, and therefore includes both fully unrestricted value and partially unrestricted value. As is evident from the description below, the system is also capable of integrating processing of stored-value instruments having "fully restricted" value, i.e. instruments in which both the type and party to a transaction effected with the value are limited in advance. The increased flexibility that ensues from eliminating some or all of such restrictions has a number of advantages that will be evident from the following description. After an individual has received a stored-value instrument with (fully or partially) unrestricted value, either as a gift or through a direct purchase, the instrument may be tailored for use by the individual using an interface with an instrument-authority system. Such tailoring may be used to specify restrictions on some or all of the value associated with the instrument, such as by defining merchants at which the instrument may be used, defining the type of transactions for which the instrument may be used, and the like.

Figure 1A:
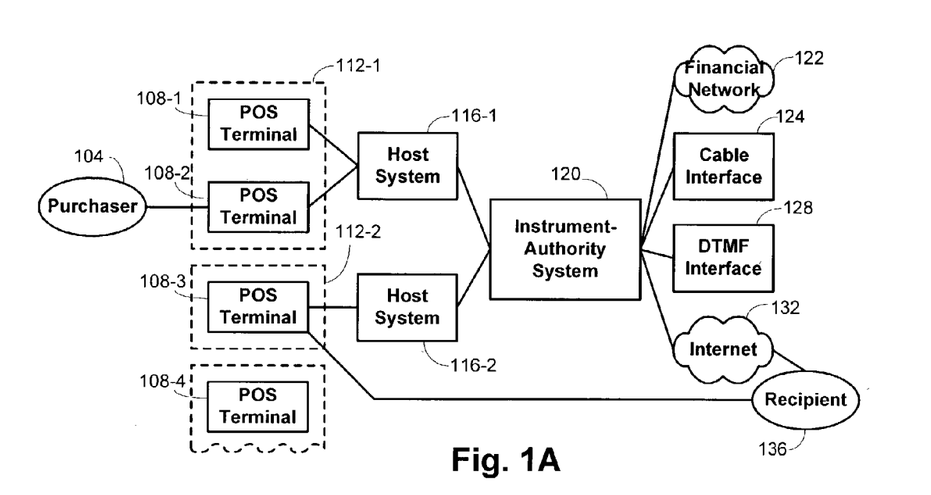
FIG. 1A provides a block diagram representation of a system arrangement used for implementing embodiments of the invention.

An overview of a structural system that may be used to implement methods of the invention is illustrated schematically in FIG. 1A. The stored-value instruments may be purchased by a purchaser 104 at a merchant location 112. Each merchant location 112 may include one or more point-of-sale terminals 108 having a capacity for reading information from the stored-value instrument. Each point-of-sale terminal 108 may be configured for interacting with an instrument-authority system 120, perhaps through a host system 116 configured to interface directly with each of the point-of-sale terminals 108 at a particular merchant location 112. The instrument-authority system 120 is adapted to manage the authentication and use of the stored-value instruments as described in further detail below. In addition to interacting with the point-of-sale terminals 108, perhaps through the host systems 116, the instrument-authority system 120 may be provided with other types of interfaces that permit direct interaction with a recipient 136 of the purchased stored-value instrument. These interfaces may, for example, comprise an Internet interface 132 such as may allow the recipient 136 to interact with the instrument-authority system 120 over the World Wide Web, a DTMF interface 128 such as may permit the recipient 136 alternatively to interact with the instrument-authority system 120 using touch-tone commands on a telephone, a cable interface 124 to permit interaction through a cable-television interface, and the like. In some instances, the recipient 136 of the stored-value instrument may be the same individual as the purchaser 104, but in other embodiments the recipient 136 may be a different individual who has received the instrument from the purchaser 104, such as by receiving it as a gift.

Figure 1B:
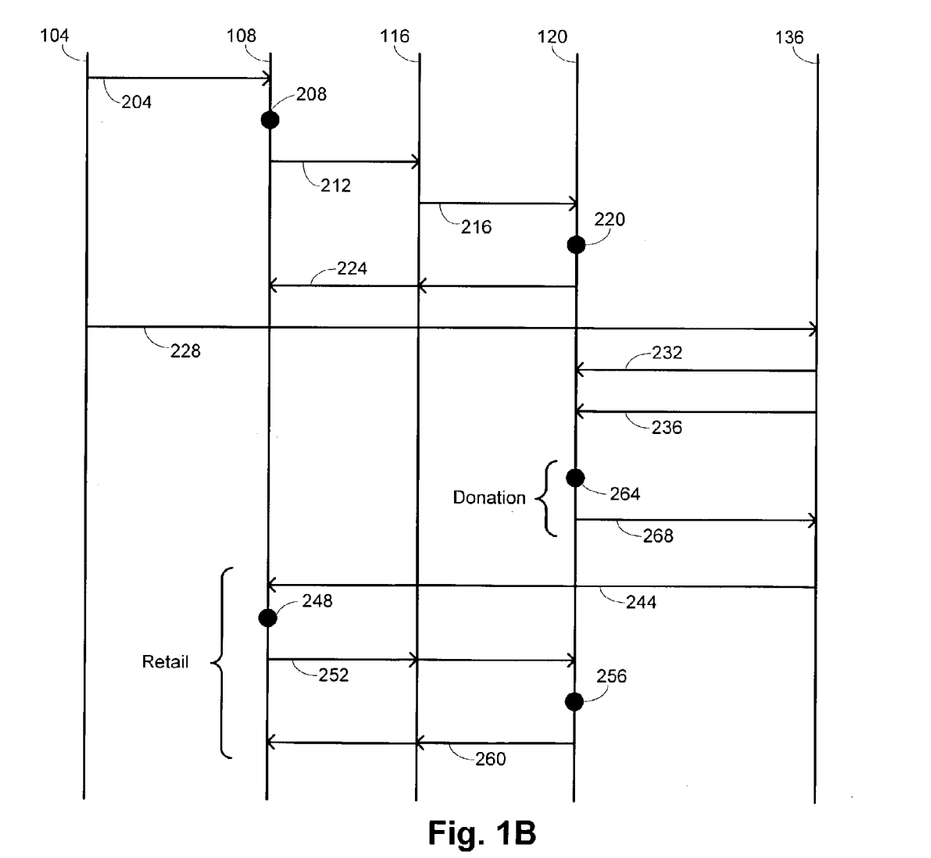
FIG. 1B provides a schematic illustration of a flow of information through the system of FIG. 1A according to embodiments of the invention.
Figure 2:
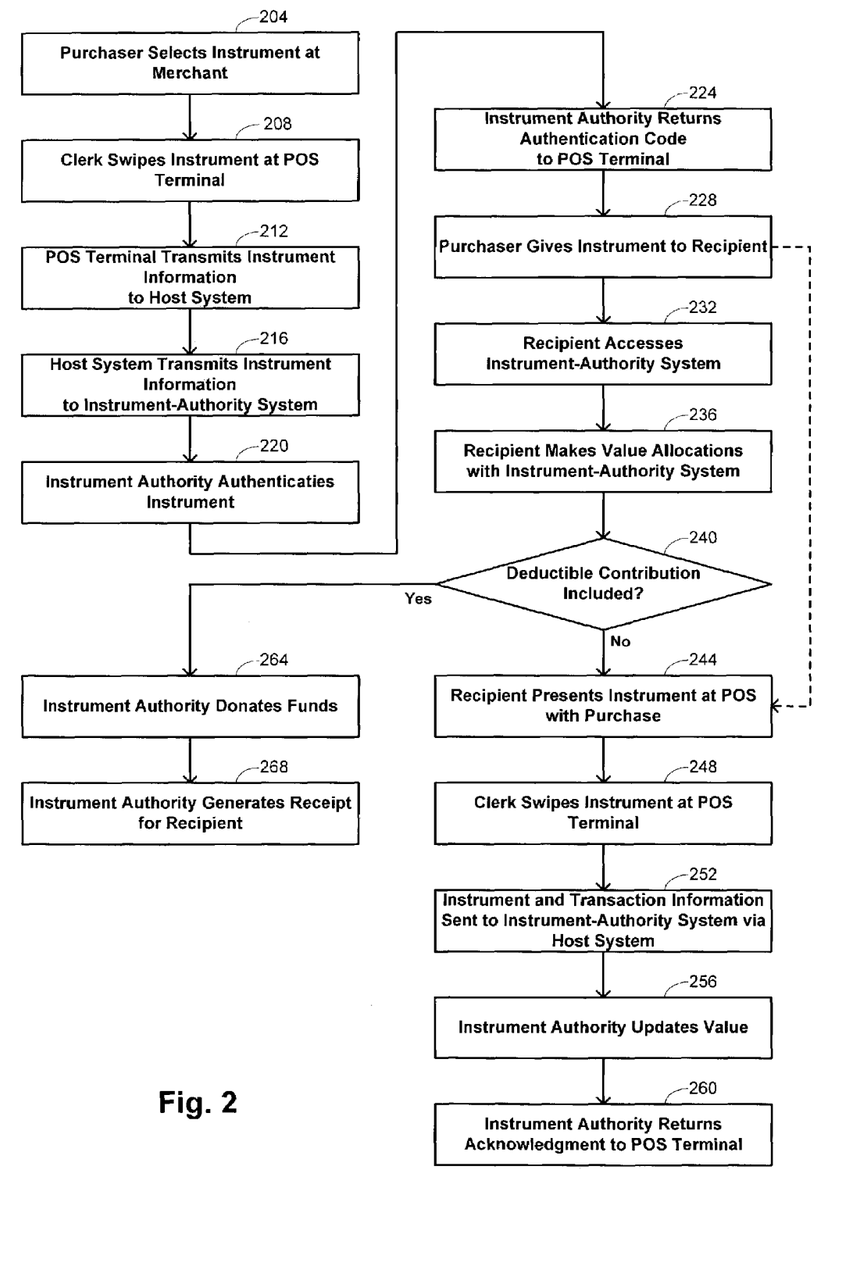
FIG. 2 is a flow diagram that summarizes methods of the invention in certain embodiments.

The manner in which the structural system illustrated in FIG. 1A may be used to implement embodiments of the invention is illustrated simultaneously with the schematic diagram of FIG. 1B and the flow diagram of FIG. 2. While FIG. 2 uses blocks to indicate functions that may be performed in implementing methods of the invention in some embodiments, FIG. 1B uses arrows to illustrate a corresponding flow of information through the system in FIG. 1A as those functions are performed. Thus, at block 204, a purchaser 104 selects an instrument for purchase at a merchant location 112. Typically, the instrument is chosen from a plurality of instruments at a merchant display, with different instruments being associated with different value amounts. In some instances, a mixture of instruments associated with fully unrestricted, partially unrestricted, and fully restricted values might be displayed, while in other instances fewer types of instruments may be displayed. For example, the display might include "$10 unrestricted cards," "$10 charity cards," "$10 Merchant X cards," "$25 unrestricted cards," "$25 charity cards," "$25 Merchant X cards," etc. The manner in which the instruments associated with value having different restriction characteristics may be processed differently, as described below.

After one of the instruments is selected for purchase, it is presented to a clerk at the merchant location 112 with payment, such as in the form of a credit card, debit card, cash, check, or the like. At block 208, the clerk provides an instrument identifier for the instrument to a point-of-sale terminal 108, such as by swiping a card through a magnetic-strip reader so that an encoded identifier may be extracted from a magnetic strip affixed to the card. In alternative embodiments, other techniques may be used to obtain the identifier, including through optical scanning, bar-code scanning, and the like. After receiving the identifier, the instrument information is transmitted by the point-of-sale terminal 108 to a host system 116 at block 212, and transmitted from the host system 116 to the instrument-authority system 120 at block 216.

The instrument-authority system 120 acts at block 220 to authenticate the instrument by validating the received identifier as corresponding to a previously unauthenticated instrument. Such authentication is performed in accordance with the value and restriction criteria associated with the instrument. Thus, for example, authentication of a "$10 unrestricted card" provides $10 in value associated with the instrument but is not limited in the type of transaction that may be performed with the instrument or with whom such a transaction may be performed. Similarly, authentication of a "$25 charity card" provides $25 in value associated with the instrument, but the type of transaction is limited to a charitable contribution; the (partially) unrestricted character of the instrument's value in this instance is manifested by the fact that no limitation is imposed on who the recipient of the charitable contribution is to be. Authentication of an instrument having fully restricted value, such as of a "$50 Merchant X card" provides $50 in value that may only be used for retail transactions with Merchant X. Irrespective of restrictions that may be imposed on use of the value, the instrument-authority system 120 returns an authentication code back to the point-of-sale terminal 108 through the host system 116, permitting the purchase of the stored-value instrument may be completed at the merchant location. It is noted that the authentication performed at block 220 does not result in full activation of an unrestricted instrument. Full activation may require a specification of a restricted allocation for the value associated with the instrument, which may be made as described below.

At block 228, the authenticated instrument is conveyed from the purchaser 104 to the recipient 136, such as part of a gift to the recipient, as part of a bonus award to the recipient, or the like. In embodiments where the value is unrestricted, either fully or partially, the recipient may impose restrictions on use of the value in accordance with his or her preferences. This may done by accessing the instrument-authority system 120, as noted at block 232, with any of the interfaces 124, 128, or 132 shown in FIG. 1A. The interface provides a mechanism by which the recipient 136 may assign or change restrictions associated with the value of the instrument at block 236. Allocation of the value according to these restrictions may be done for the entire value associated with the instrument or may be done selectively for designated portions of the value of the instrument. An example of how such allocations may be made using the Internet interface 132 is described in connection with FIG. 5 below. FIG. 2 contemplates allocations that restrict use of value to transactions involving tax-deductible contributions or retail sales of goods or services, but other restrictions may be implemented in other embodiments. In these embodiments, the instrument may be considered to be fully activated after both the authentication performed at block 200 and the allocation performed at block 236 have been completed.

The manner in which the value is subsequently used may depend on the nature of the allocation. For example, a check is made at block 240 whether the value has been allocated for a tax-deductible contribution, such as a contribution to a charity or to a political organization. If so, the value assigned for distribution to a designated party is donated automatically by the instrument authority at block 264. A receipt is generated for the recipient 136 at block 268 to acknowledge the contribution. In embodiments where the interface between the recipient 136 and the instrument-authority system 120 comprises an Internet interface, the receipt may be provided electronically. In embodiments that use other interfaces, the receipt may be provided by mail or other distribution mechanism.

Donation of the funds by the instrument-authority system 120 may be made both for value that was initially fully unrestricted or for value that was initially only partially unrestricted. For example, when the value was initially fully unrestricted, it may have been assigned by the recipient 136 to be donated to a charitable or political organization at block 236 when the value allocations were made. If the value was initially partially unrestricted, such as in an instance where the instrument was purchased by the purchaser 104 specifically for charitable contributions, the value allocations made by the recipient 136 at block 236 may have been limited to designating which charitable organization was to receive the funds. Instruments designated for such charitable contributions might be suitable, for example, as gifts made in recognition of funerals where the purchaser 104 does not know to which charity the recipient 136 would wish to donate. In embodiments where the value is already partially restricted at the time of purchase to be used for a charitable contribution, the receipt may alternatively be generated at the time of sale for delivery to the purchaser 104 instead of later to the recipient 136. This reflects the fact that the decision to make a donation in such an instance was made by the purchaser 104 rather than by the recipient 136. Such a purchaser receipt may, for example, be generated by the point-of-sale terminal 108 in response to receipt of an instruction returned to the point-of-sale terminal 108 by the instrument-authority system 120 with the authentication code at block 224.

If it is confirmed at block 240 that the value has not been assigned for dispensation as a tax-deductible contribution, then the value may be used for retail applications to purchase goods and/or services from a party, such as a merchant party, defined by the allocations at block 236. In order to use the value, the recipient then presents the stored-value instrument at a merchant location with a purchase at block 244. Use of the instrument in this way thus corresponds to use of an instrument having restricted value associated with it, although the instrument may additionally have some unrestricted value associated with it depending on the allocations made at block 236. This correspondence is highlighted by the dashed line, which shows a flow through FIG. 2 that could be followed to use an instrument initially having fully restricted value. The blocks allowing allocation of the value are bypassed and the instrument is subsequently used in the same way as an instrument in which the value was allocated by the recipient 136.

An identifier is extracted from the instrument at block 248, such as by having the clerk swipe a card to read a magnetic strip affixed to the card; in alternative embodiments, the identifier may be extracted through optical reading or by reading a bar code, for example. The identifier is transmitted to the instrument-authority system 120 at block 252 along with transaction information that identifies the amount of the transaction and the merchant party to the transaction. In response, the instrument-authority system updates the remaining stored value allocated to retail transactions with that merchant at block 256. This may comprise verifying that the transaction is being conducted with the merchant now associated with the value and comparing that value with the size of the transaction. If the transaction is for an amount greater than the allocated stored value, the value may be depleted entirely, while it may be reduced only by the amount of the transaction if that amount is less than the allocated stored value. At block 260, the instrument-authority system 120 returns an acknowledgment to the point-of-sale terminal 108 that the value has been updated in accordance with the transaction request.

In some embodiments, the instrument-authority system 120 may additionally be configured to offer a reallocation of value at the time of the retail transaction. For example, if the amount of the transaction is greater than the allocated stored value and there is other value that is unallocated or is otherwise allocated, the instrument-authority system 120 may generate a reallocation offer. Such a reallocation offer might suggest, for example, that some or all of the unallocated value be allocated for retail use at the merchant and applied to the current transaction. The offer is communicated to the recipient 136 via the host system 116 and point-of-sale terminal 108, such as with a message to the clerk so that the clerk may query the recipient 136 and enter a response with the point-of-sale terminal 108. The reallocation offer may be accepted or declined by the recipient 136, with the response being communicated back to the instrument-authority system 120 through the point-of-sale terminal 108 and host system 116. If the proposed reallocation is accepted, the instrument-authority system 120 performs the reallocation and applies the reallocated value to the transaction before returning the acknowledgment to the point-of-sale terminal at block 260.

In addition to the functions shown in FIG. 2, settlement functions may be performed to accommodate the allocations made by the recipient. These settlement functions may be performed by the instrument-authority system 120 or may be performed by another system that receives allocation information from the instrument-authority system 120. In particular, over any period of time, such as a day, the method outlined in FIG. 2 may have been executed a large number of times for different stored-value instruments. Each of these stored-value instruments will have been- purchased at certain merchant locations, with the respective merchants having received the full value associated with each instrument sold there. This value may have been allocated by recipients, however, for redemption at a number of different merchants. The settlement process thus determines, for each of a plurality of merchants, how much that merchant has collected from the sale of instruments having unallocated value and how much of the total value among all the merchants has been restricted for use at that merchant. Corrections are made by initiating transfers of funds among the merchants such that the value restricted for use at each merchant corresponds to the net amount that merchant has received from purchasers of the stored-value instruments. Such settlement functions may be performed on any convenient periodic basis, such as daily, weekly, etc.

In some embodiments, time limits may be imposed requiring that value allocations be made within a certain predetermined time after authentication of the value. This requirement may be particularly suitable in applications where the value is initially partially unrestricted. For example, when instruments are sold to purchasers 104 having value that is designated for charitable contribution, but is otherwise unrestricted, the instrument-authority system 120 may require that allocations be made within, say, one year. If that time passes without the value having been allocated by the recipient 136 to any charity, the instrument-authority system 120 may automatically designate the unallocated value to a specific charity. Such an arrangement provides a reasonable time for the recipient 136 to make the allocation, but ultimately gives effect to the specific desire of the purchaser 104 for the value to be used for charitable purposes.

Since transmission of information related to the stored-value instrument may form only a part of the transaction, the point-of-sale terminal 108 may additionally be employed to capture information needed also to complete the remainder of the transaction. Accordingly, the point-of-sale terminal 108 may include or be in communication with associated equipment or devices used for capturing such information, such as bar-code information identifying an item that forms part of the full transaction. Furthermore, the point-of-sale terminal 108 may include other components that facilitate execution of a transaction, such as payment-information-entry components, signature-capture components, keypads, keyboards, display screens, biometric-data-capture components, speakers, printers, processors, software, memory, communication devices, and the like. Examples of suitable point-of-sale devices that include multiple capabilities are provided in the following commonly assigned applications, the entire disclosures of which are incorporated herein by reference for all purposes: U.S. Prov. Pat. Appl. No. 60/147,889, entitled "INTEGRATED POINT OF SALE DEVICE," filed Aug. 9, 1999 by Randy J. Templeton et al.; U.S. Pat. Appl. Ser. No. 09/634,901, entitled "POINT OF SALE PAYMENT SYSTEM," filed Aug. 9, 2000 by Randy J. Templeton et al.; U.S. Pat. Appl. Ser. No. 10/116,689, entitled "SYSTEMS AND METHODS FOR PERFORMING TRANSACTIONS AT A POINT-OF-SALE," filed Apr. 3, 2002 by Earney Stoutenburg et al.; U.S. Pat. Appl. Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. Pat. Appl. Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. Pat. Appl. Ser. No. 10/116,735, entitled "SYSTEMS AND METHODS FOR CONFIGURING A POINT-OF-SALE SYSTEM," filed Apr. 3, 2002 by Earney Stoutenburg.

Figure 3:
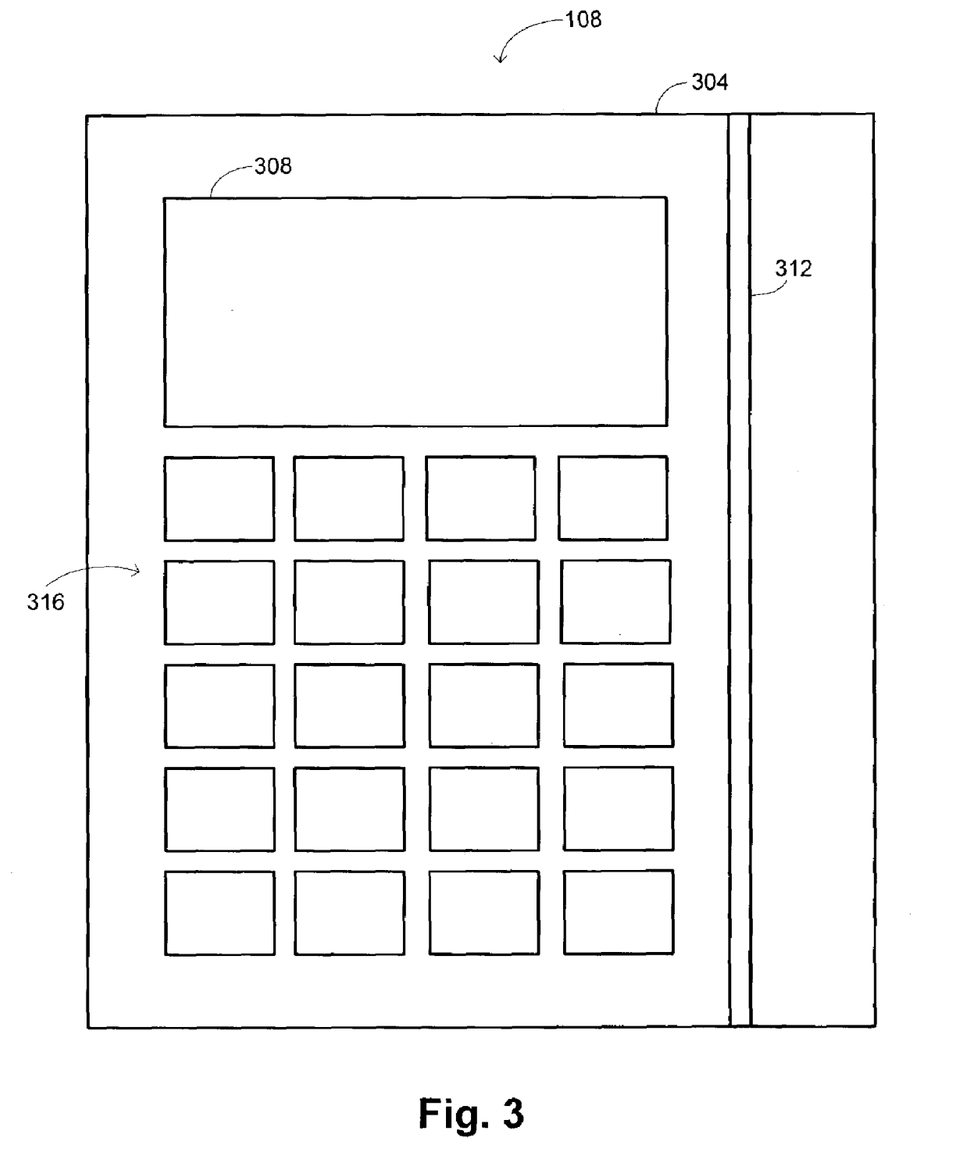
FIG. 3 is a schematic diagram of a point-of-sale terminal that may be used with the system of FIG. 1A.

One specific example of how a point-of-sale terminal 108 may be constructed is illustrated in FIG. 3. In this embodiment, the point-of-sale terminal 108 comprises a housing 304 having a keypad 316 for entering various types of information. The keys of the keypad 316 may permit the entry of numbers or letters, or may be function keys for performing various predefined functions. The terminal 108 further includes a display screen 308 for displaying information relating to a transaction. A card reader 312 is also provided for reading information from cards, such as from a magnetic stripe included on instruments that have the form of cards. The card reader 312 may thus read payment information, identification information, and the like from encoding on the cards. In some instances, the point-of-sale terminal 108 may be connected to an attached printer, such as an FDX-400 printer available from AXIOHM.

Figure 4:
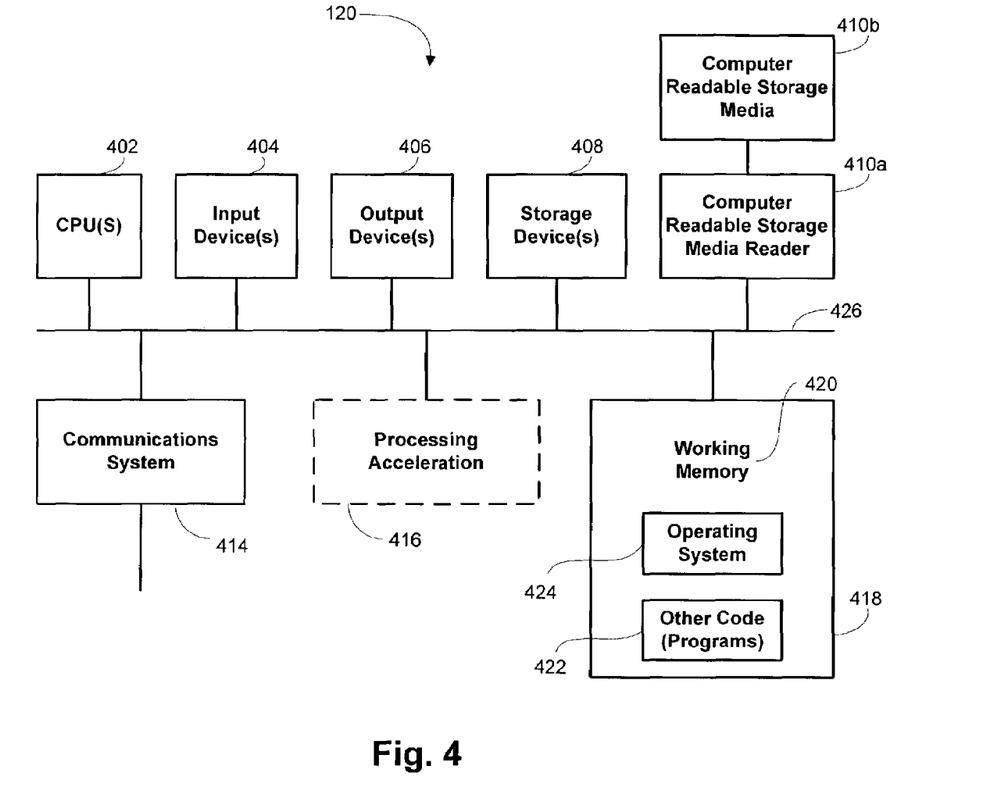
FIG. 4 is a schematic illustration of a computer system on which methods of the invention may be embodied.

FIG. 4 provides a schematic illustration of a structure that may be used to implement the instrument-authority system 120; a similar structure may be used for implementation of the host system. FIG. 4 broadly illustrates how individual system elements may be implemented in a separated or more integrated manner. The instrument-authority system 120 is shown comprised of hardware elements that are electrically coupled via bus 426, including a processor 402, an input device 404, an output device 406, a storage device 408, a computer-readable storage media reader 410a, a communications system 414, a processing acceleration unit 416 such as a DSP or special-purpose processor, and a memory 418. The computer-readable storage media reader 410a is further connected to a computer-readable storage medium 410b, the combination comprehensively representing remote, local, fixed, and/or removable storage devices plus storage media for temporarily and/or more permanently containing computer-readable information. The communications system 414 may comprise a wired, wireless, modem, and/or other type of interfacing connection and permits data to be exchanged with the host system 116, point-of-sale terminals 108, cable interface 124, DTMF interface 128, and/or Internet interface 132, as described in connection with FIGS. 1A, 1B, and 2.

The instrument-authority system 12 also comprises software elements, shown as being currently located within working memory 420, including an operating system 424 and other code 422, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 5:
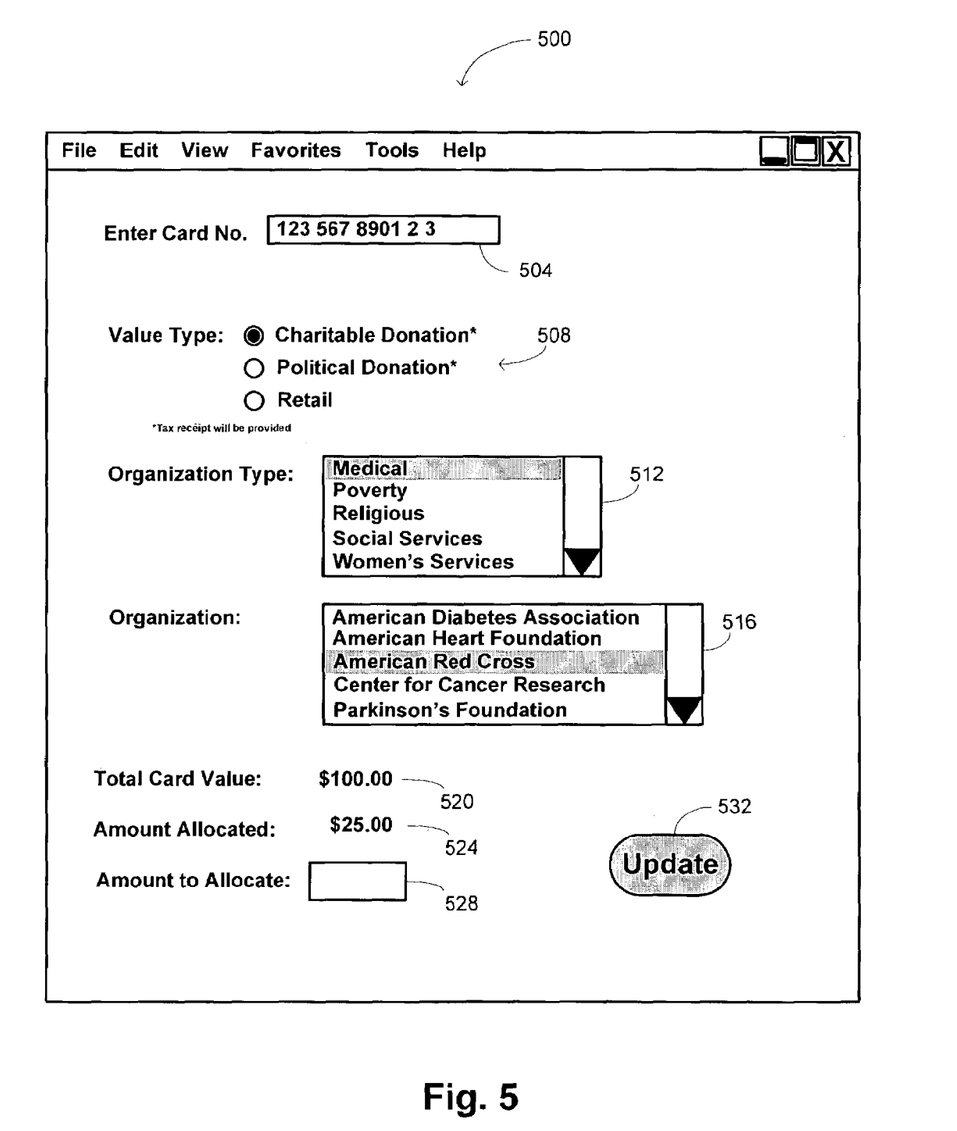
FIG. 5 is an exemplary display screen that may be provided in an embodiment of the invention.

FIG. 5 provides an exemplary screen 500 that may be shown to a recipient 136 when using the Internet interface 132 to assign value allocations for an instrument having unrestricted value associated with it. In embodiments that use a different interface with the instrument-authority system 120, similar information may be provided to the recipient 136 in a different format to accommodate the form of the interface. The content of the screen 500 is shown for an example in which the value associated with a particular instrument is fully unrestricted, although the screen may be similar when the value is only partially unrestricted; in such instances, some of the choices available for designating restrictions may be replaced with an indication of the existing restriction.

The screen includes a field 504 for entering an identifier for the instrument. This identifier will usually be printed on the instrument so that it may be read and entered in by the recipient. In some instances, this identifier may be the same identifier that is transmitted for identification by one of the point-of-sale terminals 108, such as after being read from a magnetic strip affixed to a card, although this is not a requirement and different identifiers may be used. The types of restrictions that may be imposed on the value associated with the instrument are indicated with one or more selection fields, which may use any suitable mechanism for presenting choices for the restrictions to the recipient and receiving the selection from the recipient. For example, as assignment of the type of transaction for the value may be made with a field 508 having radio buttons, permitting designation of the value as for a charitable donation, a political donation, a retail transaction, or other type of transaction.

Fields 512 and 516 illustrate the use of drop-down menus for restricting the party to the transaction. The combination of two fields is used to organize the parties more efficiently when the number of potential parties is large. For example, in the context of a charitable donation, field 512 provides a list of types of organizations that may receive the donation and field 516 provides a list of the organizations that meet the highlighted organization type. If field 508 had selected "political donation" or "retail," the choices offered in fields 512 and 516 would differ appropriately to allow the selection of political-donation recipients or merchants respectively.

The screen also includes fields that permit partial allocation of value in accordance with the selections identified in fields 508, 512, and 516. In field 520, the total value available on the instrument is shown to be $100. This amount may change when the recipient 136 subsequently contacts the instrument-authority system 120 to reflect execution of transactions with the stored value. In some instances, the value amount may increase to reflect a reloading of the value associated with the instrument. Field 524 identifies the amount of the total instrument value that has already been restrictively allocated. Field 528 permits the recipient 136 to enter the amount of unrestricted value that is to be allocated in accordance with the selections identified in fields 508, 512, and 516. An update button 532 indicates that the recipient 136 has completed his or her selections and instructs the instrument-authority system 120 to update the value allocations in accordance with those selections. The recipient 136 may generally enter multiple such selections for different portions of the unrestricted value so that the value is partitioned as desired. In some embodiments, the selections made by the recipient 136 may be fixed so that the assigned value acts in every way as restricted value, but in other embodiments, the recipient 136 may be permitted later to alter the allocations.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for processing a stored-value instrument, the method comprising:
   authenticating at an instrument-authority system an unrestricted value associated with the stored-value instrument in response to an authentication request received from a merchant point-of-sale terminal;
   receiving at the instrument-authority system an allocation request for a restricted allocation of at least a portion of the authenticated value associated with the stored-value instrument;
   allocating the authenticated value associated with the stored-value instrument in accordance with the allocation request, wherein allocating the authenticated value comprises assigning at least a portion of the authenticated value for purchases at a specified merchant;
   receiving at the instrument-authority system from a point-of-sale terminal at a location of the specified merchant transaction information identifying the stored-value instrument and a debit amount, wherein the debit amount is greater than the authenticated value of the stored-value instrument assigned for purchases at the specified merchant;
   transmitting an offer to the point-of-sale terminal at the location of the specified merchant to reallocate portions of the authenticated value for purchases at the specified merchant;
   receiving at the instrument-authority system from the point-of-sale terminal at the location of the specified merchant an acceptance of the offer;
   reallocating the authenticated value associated with the stored value instrument in accordance with the offer; and
   reducing the authenticated value of the stored-value instrument assigned for purchases at the specified merchant in accordance with the reallocated authentication value.

2. The method recited in claim 1 wherein allocating the authenticated value comprises assigning at least a portion of the authenticated value for a donation.

3. The method recited in claim 2 wherein the donation qualifies for a tax deduction.

4. The method recited in claim 3 further comprising transmitting a receipt for an amount of the donation to a holder of the stored-value instrument.

5. The method recited in claim 1 further comprising:
   receiving at the instrument-authority system from a point-of-sale terminal at a location of the specified merchant transaction information identifying the stored-value instrument and a debit amount; and
   reducing the authenticated value of the stored-value instrument assigned for purchases at the specified merchant by the debit amount.

6. The method recited in claim 1 wherein the allocation request specifies a plurality of portions of the authenticated value to be allocated differently.

7. A system for processing a stored-value instrument, the system comprising:
   a communications system;
   a storage device;
   a processor in communication with the communications system and the storage device; and a memory coupled with the processor, the memory comprising a computer-readable storage medium having a computer-readable program embodied therein for directing operation of the system, the computer-readable program including:

instructions for authenticating with the processor an unrestricted value associated with the stored-value instrument in response to an authentication request received with the communications system from a merchant point-of-sale terminal;

instructions for receiving with the communications system an allocation request for a restricted allocation of at least a portion of the authenticated value associated with the stored-value instrument;

instructions for allocating with the processor the authenticated value associated with the stored-value instrument in accordance with the allocation request, wherein the instruction for allocating the authenticated value comprise instructions for assigning with the processor at least a portion of the authenticated value for purchases at a specified merchant;

instructions for receiving with the communications system from a point-of-sale terminal at a location of the specified merchant transaction information identifying the stored-value instrument and a debit amount, wherein the debit amount is greater than the authenticated value of the stored-value instrument;

instructions for transmitting with the communications system to the point-of-sale terminal at the location of the specified merchant an offer to reallocate portions of the authenticated value for purchases at the specified merchant;

instructions for receiving with the communications system from the point-of-sale terminal at the location of the specified merchant an acceptance of the offer;

instructions for reallocating with the processor the authenticated value associated with the stored value instrument in accordance with the offer; and instructions for reducing with the processor the authenticated value of the stored-value instrument assigned for purchases at the specified merchant in accordance with the reallocated authentication value.

8. The system recited in claim 7 wherein the instructions for allocating the authenticated value comprise instructions for assigning at least a portion of the authenticated value for a donation.

9. The system recited in claim 8 wherein the computer-readable program farther comprises instructions for transmitting with the communications system a receipt for an amount of the donation.

10. The system recited in claim 7 wherein the computer-readable program farther includes:

instructions for receiving with the communications system from a point-of-sale terminal at a location of the specified merchant transaction information identifying the stored-value instrument and a debit amount; and instructions for reducing with the processor the authenticated value of the stored-value instrument assigned for purchases at the specified merchant by the debit amount.

* * * * *